Nov. 4, 1941.   D. S. BEACH   2,261,638
COVERING MATERIAL AND PROCESS OF MAKING SAME
Filed Jan. 21, 1938
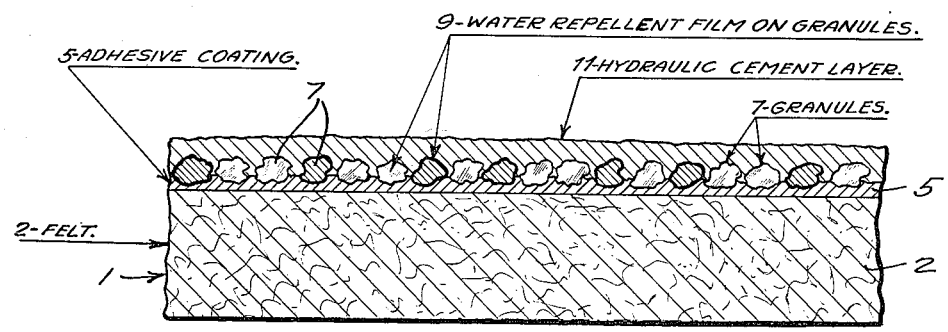
INVENTOR
DELBERT S. BEACH
BY Alfred F. Ernst
ATTORNEY Patented Nov. 4, 1941

2,261,638

UNITED STATES PATENT OFFICE 2,261,638

COVERING MATERIAL AND PROCESS OF MAKING SAME

Delbert S. Beach, Kenmore, N. Y., assignor to Certain-Teed Products Corporation, New York, N. Y., a corporation of Maryland Application January 21, 1938, Serial No. 186,084

5 Claims. (Cl. 91—68)

This invention relates to covering materials and covering elements and more especially covering materials and covering elements which are to be exposed to the weather. The invention particularly relates to such covering materials and elements which have a cementitious surfacing layer carried upon a granular layer.

Covering materials and elements, particularly roofing elements and shingles, have been proposed which are provided with a surfacing layer of granular material upon which layer of granular material a coating or layer of cementitious material is applied to provide the element with a desired texture or finish as well as to secure other advantages such as greater stiffness, resistance to wear and to the weather and other desired results. In connection with the manufacture of roofing and roofing elements which are made with a base sheet of felt which is saturated with asphalt or similar bituminous impregnating material and which carry on a face of the sheet a mastic coating of asphalt or bituminous binder which serves to bind to the sheet a layer of granular material such as slate, it has been proposed heretofore to apply a layer of cementitious material such as Portland cement or other hydraulic cement in the form of a wet mix or slurry. It has been the intention of such proposals that when such a coating of cementitious material is set this cementitious layer will be bound to the granular layer, by virtue of a mechanical bond and the adhesion of the cement to the granules to provide greater strength and resistance as referred to above, and that by virtue of the granules being bound upon the base by the mastic coating the cementitious layer will be firmly bound to the base. Such cementitious coatings may be so applied as to produce a rough texture or a smooth surface as desired or they may be molded or otherwise treated to secure the desired decorative and artistic effects.

It has been found in the application of such cementitious materials to granular surfaced bases, such as granular surfaced or slate surfaced asphalt coated felt base roofing, that a difficulty which has been experienced in the manufacture and use of such granular surfaced asphalt becomes aggravated. This difficulty is called "blistering" in connection with granular surfaced asphalt coated roofing and is believed to arise because the high melting point asphalt of the coating does not readily wet the slate or other mineral granules and because of this failure a poor bond may occur between some of the granules and said coating. The granules, however, are easily wetted by water and, therefore, during rains the granule will attract or absorb water and by capillary action the moisture may creep deeply down into the pocket of the asphalt in which the granule is positioned but has not a good water sealing contact with the asphalt. When the roofing is subjected to heat, the asphalt coating will soften and may produce a watertight bond at the upper surface of the coating between the asphalt coating and the granule. The moisture below the surface of the asphalt may thus become entrapped. Additional heat will eventually cause this moisture to vaporize and expand and because of the increased volume of the vapor, the granular material will be blown or pushed from the coating.

In order to overcome this difficulty in a similar manner to the practice in the manufacture of slate or granular surfaced asphalt roofing, it has been suggested for coverings carrying a cementitious layer to apply an oil to the granules which are to be bound upon the asphalt coating and which are to serve as a layer to which the cementitious material will adhere. As is well known such an oil improves the wetting of granules by the asphalt, resists the attraction of water to the granules and substantially prevents the blistering.

Cementitious materials, that is, hydraulic cements, such as Portland cement, however, are applied as wet mixes or slurries containing water or require the addition of water to secure setting. By the very fact that the oil resists the attraction of water the necessary contact of the cementitious material and the mechanical interlocking or other action which normally secures strong binding of the cementitious layer to the granules when not oiled is prevented or is so reduced that the cementitious layer when dry will not properly adhere to the granular layer. It therefore may break off or become loosened as a whole and crack or otherwise deteriorate. When granules which have not been oiled are used and when the wet cementitious layer is applied to such granular layer, these granules are in condition to strongly attract the water from the mix and may become very wet either by absorbing the water or by capillary action, or by both. Moreover the set layer of cementitious material is not waterproof and when wet, as by rain, it may transmit water to the granules to be absorbed thereby. The condition of "blistering" therefore may become greatly aggravated in a roofing material carrying a cementitious layer super-imposed upon a granular layer upon the asphalt coated base.

In order to overcome these difficulties the invention proposes that the granules be coated with a coating which will substantially maintain or not interfere with the attraction which normally exists between the cementitious layer and the uncoated granules and which at the same time will resist the attraction of water without interfering with the adhesion of the granules to the asphalt coating. The invention proposes therefore to treat the granules so as to provide a priming coating which will prevent the attraction and absorption of water thereto or thereinto so that substantially blistering is prevented. The coating or priming medium is such as to maintain the attraction of the cementitious layer when dry to the granules so that separation of the layer from the granules and breaking off of this cementitious material therefrom is prevented. This coating or priming medium while resistant to the attraction of water, including the water carried by the cementitious layer when wet, is such as to substantially maintain surface characteristics of the granules both as to mechanical form of the surface and as to its capillary active properties.

In order to secure the desired surface characteristics in the granules while also providing the priming and coating thereof, the invention proposes to coat the granules with materials of the type of varnishes and lacquers including solutions of resins, both natural and synthetic, oleo-resins, pyroxylin lacquers and similar materials which may be suspended in a solvent or in a vehicle which will evaporate or harden and leave the coating solid and distributed in a thin film or a thin layer over the granule so as substantially to cover it to such an extent as to prevent the absorption of water and the attraction of water thereto. In some cases also the invention may utilize a siccative oil which may be thinned by suitable solvents. In general such coating materials are used as will secure upon the granules a dry solid coating properly distributed and of such reduced thickness as not materially to interfere with the mechanical form and surface properties thereof which effect adhesion of the cementitious material thereto.

For the purpose of the invention there may be utilized various types of coating materials and solutions. Among those which are suitable for the purpose of securing the desired resistance to the attraction of water and which may be applied so as to form relatively thin film upon the granule while substantially sealing the same are the natural resins which may be dissolved in suitable organic solvents or may be dispersed in water; the synthetic resins including those which may be dissolved in suitable solvents as well as those which may be formed as condensation products; pyroxylin lacquers, resinous and oleo-resinous varnishes, various natural gums such as kauri gum, etc.; a siccative oil such as linseed oil may be used. With such materials it is possible to produce a hard dry coating spread upon the granules in a thin film capable of sealing the granules without substantially modifying the surface characteristics so as to maintain the adhesive character thereof.

I am aware that it has been proposed heretofore to apply solutions of resins, pyroxylin lacquers, oleo-resinous varnishes and similar coatings to granules including those which are applied to asphalt coated roofing materials. The use of such coatings in combination with a cementitious layer applied as a wet mix to prevent the attraction and absorption of the water carried by the wet cementitious layer laid upon a granular layer bound upon a bituminous or asphalt coated base or transmitted by said layer when set has not heretofore been suggested. The invention makes practical an improvement in the art of roofing and similar covering materials afforded by the application of cementitious materials to the granular surfaced roofing and affords the advantages of insuring that the mechanical strength, variety of texture and color and other features which may be obtained with such cementitious finishing layers are permanently maintained. By preventing the "blistering" which occurs in asphalt roofing when moisture is carried by or upon the granules the invention insures the permanency of the finishing cementitious layer and thereby increases the life of the roofing or covering materials which utilize such finishing layers of cementitious materials.

The invention contemplates the process of producing covering materials which carry upon a face thereof to be exposed to the weather or to moisture conditions a surfacing layer of cementitious material. This process includes the steps of applying to granules of durable material for imposition on the adhesive coating upon a base sheet to which the surfacing layer of cementitious material is to be applied a coating or film of water repellent material. This coating or film is of such character and is so applied as substantially to maintain the surface characteristics of the granules so that their capacity to adhere to the adhesive coating upon the base sheet is maintained without interfering with the surface characteristics of the granules which provide for the attraction or bond between the cementitious layer and the granular material which is effective to bind it to the sheet.

In the drawing is shown a covering material having a base felt 2 of the usual type used in the manufacture of roofing felts. Upon the upper face of said felt is applied a coating of bituminous adhesive, such as asphalt, which serves to seal this face of the felt and to bind thereto a surfacing layer of durable granular material 7, for example, slate granules. In the embodiment of the invention illustrated in the figure the granules carry upon their surfaces the water resistant or repellent film 9 which may be a resinous material or other of the film forming materials which have been described above. This water repellent film is so applied to the granules as to maintain the surface characteristics thereof both as to the mechanical form of the granule surface and as to its capillary active properties in order that the bond of the hydraulic cement facing layer 11 for the granules will be secured.

The coating or film upon the granules may be applied to the granules after they have been caused to adhere to the adhesive coating upon the base sheet. Such a method of coating will provide for considerable resistance to the absorption of water by the granules and, when the coating or film extends well down upon the joint between the granules and the adhesive coating, may serve to prevent to a considerable extent the entrance of water or moisture into the granule and between it and the adhesive coating. In the preferred process, however, which results in the product illustrated in the drawing, the granules are first coated with the water repellent coating or film so as substantially or to a considerable extent encase the granules individually in the film of coating material. The coated granules are then applied to the adhesive coating upon the base. In either case, after the granules are coated and applied to the base sheet, the layer of cementitious material as a wet mix or slurry is applied over the granular surfacing adhering to the coating upon the base sheet. The cementitious layer or hydraulic cement then is allowed to set and dry, the water repellent layer interposed between the body of the granules and the cementitious layer of hydraulic cement preventing the entrance of moisture into the granules and therebeneath, while, because of the character of the coating material and of the limited thickness of the film, the bond between the cementitious layer of hydraulic cement and the granules is secured. The process, therefore, is a modification of the usual process of producing a covering which has a cementitious layer bound upon the granular surfacing adhering to a mastic coated base by inclusion of the step of treating the granules with the sealing or water-repelling coating and film before the cementitious layer is applied to the sheet.

The amount of the coating material applied suitable for the purpose of the invention may vary with different types of granules and coaters. In general a coating of the materials which have been referred to may be applied in the relation of about 1.5 lbs. to 40 lbs. of the solids of the coater per ton of the granules. This amount of material may be substantially uniformly or adequately distributed over the surfaces of the granules by forming solutions or suspensions of the coating material in a suitable amount of vehicle.

Having thus described my invention I now claim:

1. Covering material intended to be exposed to the weather comprising a base sheet of felted fibrous material impregnated with asphalt and having on a face thereof a layer of asphalt, a layer of durable granular material bound upon said sheet by said layer of asphalt, and a layer of hydraulic cement in set condition carried upon said granular layer to provide a finish facing for said covering material, the granules of said granular material being coated with a dried coating of a resinous material in the form of a film of such limited thickness as substantially to maintain the surface characteristics of the granules both as to mechanical form of the surface and as to its capillary active properties extending about and substantially sealing the granules while substantially maintaining the adhering capacity of the granules with respect to the asphalt layer, said film on the granules providing a material and a surface thereof interposed between said granules and said hydraulic cement layer to which said hydraulic cement layer when set bonds to hold said hydraulic cement layer upon the covering.

2. Covering material intended to be exposed to the weather comprising a base sheet of felted fibrous material impregnated with asphalt and having on a face thereof a layer of asphalt, a layer of durable granular material bound upon said sheet by said layer of asphalt, and a layer of hydraulic cement in set condition carried upon said granular layer to provide a finish facing for said covering material, the granules of said granular material being coated with a dried coating of a natural resin in the form of a film of such limited thickness as substantially to maintain the surface characteristics of the granules both as to mechanical form of the surface and as to its capillary active properties extending about and substantially sealing the granules while substantially maintaining the adhering capacity of the granules with respect to the asphalt layer, said film on the granules providing a material and a surface thereof interposed between said granules and said hydraulic cement layer to which said hydraulic cement layer when set bonds to hold said hydraulic cement layer upon the covering.

3. Covering material intended to be exposed to the weather comprising a base sheet of felted fibrous material impregnated with asphalt and having on a face thereof a layer of asphalt, a layer of durable granular material bound upon said sheet by said layer of asphalt, and a layer of hydraulic cement in set condition carried upon said granular layer to provide a finish facing for said covering material, the granules of said granular material being coated with a dried coating of a synthetic resin in the form of a film of such limited thickness as substantially to maintain the surface characteristics of the granules both as to mechanical form of the surface and as to its capillary active properties extending about and substantially sealing the granules while substantially maintaining the adhering capacity of the granules with respect to the asphalt layer, said film on the granules providing a material and a surface thereof interposed between said granules and said hydraulic cement layer to which said hydraulic cement layer when set bonds to hold said hydraulic cement layer upon the covering.

4. Covering material intended to be exposed to the weather comprising a base sheet of felted fibrous material impregnated with asphalt and having on a face thereof a layer of asphalt, a layer of durable granular material bound upon said sheet by said layer of asphalt, and a layer of hydraulic cement in set condition carried upon said granular layer to provide a finish facing for said covering material, the granules of said granular material being coated with a dried coating of an oleo-resinous material in the form of a film of such limited thickness as substantially to maintain the surface characteristics of the granules both as to mechanical form of the surface and as to its capillary active properties extending about and substantially sealing the granules while substantially maintaining the adhering capacity of the granules with respect to the asphalt layer, said film on the granules providing a material and a surface thereof interposed between said granules and said hydraulic cement layer to which said hydraulic cement layer when set bonds to hold said hydraulic cement layer upon the covering.

5. Process of producing a covering material intended to be exposed to the weather which comprises applying to an asphalt saturated felt sheet a layer of asphalt upon a face thereof, coating durable granular material with a resinous material so as to form a dried coating thereon as a film of such limited thickness as substantially to maintain the surface characteristics of the granules both as to mechanical form of the surface and as to its capillary active properties, applying said coated granules to the asphalt layer so as to cause said granules to adhere to said layer, and then applying to said granular surfaced sheet a layer of hydraulic cement as a wet mix or slurry capable of setting.

DELBERT S. BEACH.